March 3, 1970  A. SUTARUK  3,498,431
FLUID COUPLING MECHANISM
Original Filed Dec. 6, 1966  2 Sheets-Sheet 1

INVENTOR
ALEX SUTARUK
BY Yound, Flynn & Tarolli
ATTORNEYS

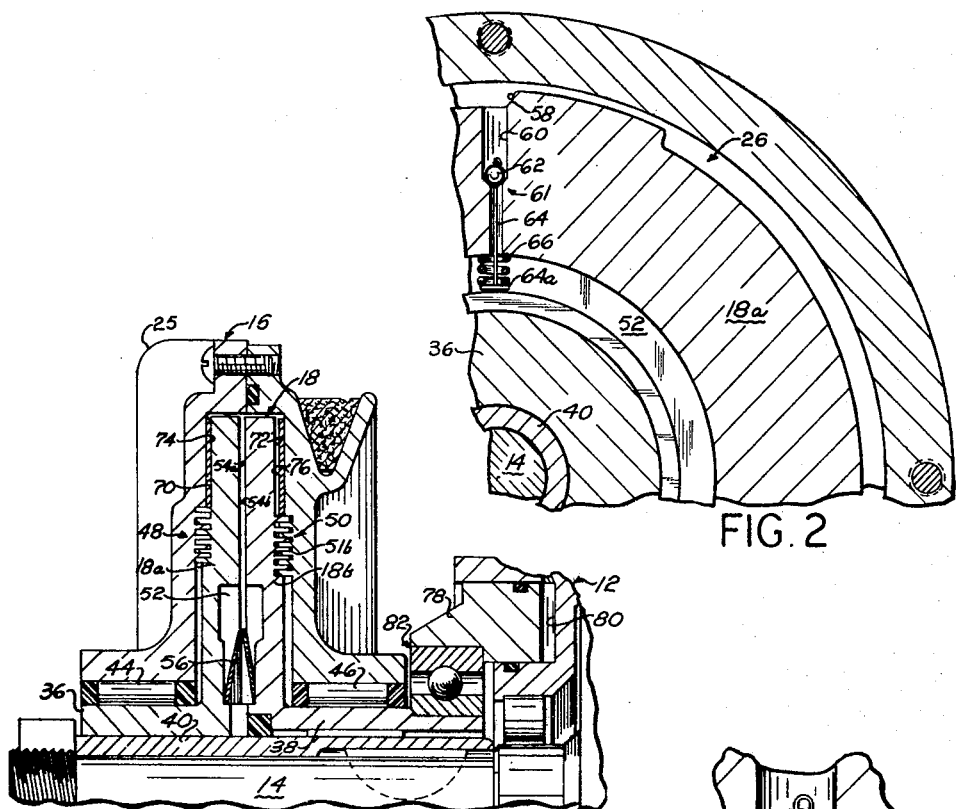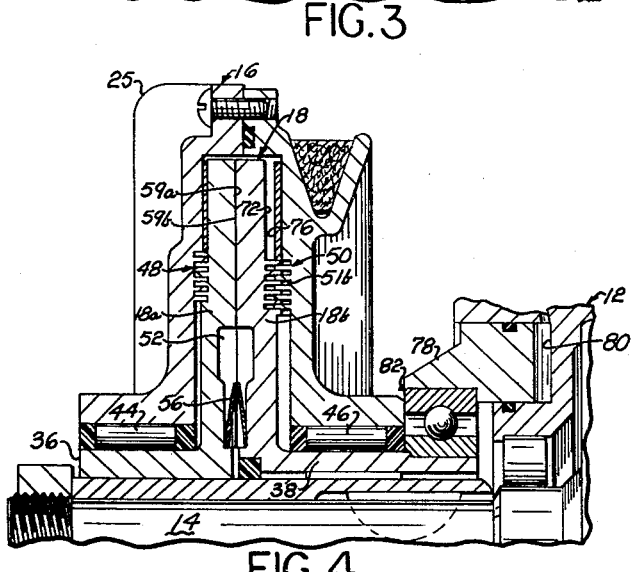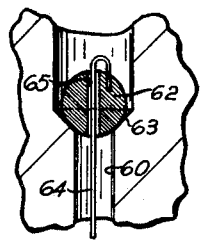

United States Patent Office 3,498,431
Patented Mar. 3, 1970

3,498,431
FLUID COUPLING MECHANISM
Alex Sutaruk, Hazel Park, Mich., assignor to Eaton Yale & Towne Inc., Cleveland, Ohio, a corporation of Ohio
Original application Dec. 6, 1966, Ser. No. 599,630. Divided and this application Jan. 13, 1969, Ser. No. 790,599
Int. Cl. F16d *25/00, 13/42, 43/28*
U.S. Cl. 192—57                                   13 Claims

ABSTRACT OF THE DISCLOSURE

An improved drive mechanism for driving an air compressor includes a driving member which is adapted to be connected to an engine of a vehicle and a driven member which is adapted to be connected to the air compressor. The drive mechanism is controlled by the air pressure output of the compressor to provide a mechanical drive between the driving and driven members when the air pressure output of the compressor is below a first predetermined pressure and a fluid drive between the members when the air pressure is above the first predetermined pressure. The fluid drive between the members is discontinued when the output of the compressor reaches a second predetermined pressure. A speed responsive valve assembly is provided for limiting the speed at which the compressor can be driven by the fluid drive.

---

This is a division of application Ser. No. 599,630 filed Dec. 6, 1966, now Patent No. 3,445,057.

The present invention relates to a drive mechanism, and particularly, to a drive mechanism having relatively rotatable driving and driven members and through which fluid and friction drive relationships are established to drive a vehicle accessory from the vehicle engine.

An important object of the present invention is the provision of a new and improved drive mechanism for driving an air compressor wherein the drive mechanism is controlled by air pressure output of the air compressor to provide a mechanical drive between driving and driven members when the air pressure output of the compressor is below a predetermined pressure and a fluid drive between the members when the air pressure is above the predetermined pressure.

Another object of the present invention is the provision of a new and improved drive mechanism, as noted above, wherein the fluid drive is speed controlled to avoid the detrimental effects of overspeeding, such as overheating, wear, etc., and the mechanical drive provides a higher drive ratio to obtain a higher output speed during operation of the engine in the lower speed range.

A further object of the present invention is the provision of a new and improved air compressor drive, as noted above, wherein the fluid drive for the air compressor is interrupted when the air pressure output of the compressor reaches a predetermined maximum pressure.

A still further object of the present invention is the provision of a new and improved drive mechanism, as noted above, wherein a safety feature is provided by establishing the mechanical drive between the driving and driven members whenever the air pressure output of the air compressor drops below a minimum air pressure, thus insuring that minimum air pressure will be provided at all times during vehicle operation.

Another object of the present invention is the provision of a new and improved fluid drive mechanism having relatively rotatable driving and driven members, one of the members surrounding the other member and providing a chamber within which the other member rotates, the other member having relatively axially movable parts, the arrangement being such that when the parts are spaced from one another, a fluid drive is provided between the members and when the parts engage one another, the fluid drive between the members is discontinued.

A further object of the present invention is the provision of a new and improved fluid drive mechanism, as noted above, in which the drive is transmitted between the members by a fluid shear medium acting between shear surfaces of the members and wherein the flow of fluid into the shear space between the shear surfaces is blocked when the parts of the other member engage and the volume of shear fluid in the shear space in relationship to the area of the shear space is substantially reduced so that the fluid drive is discontinued.

A further object of the present invention is the provision of a new and improved drive mechanism, as noted in the next preceding object, wherein spring means are disposed between the parts of the other member to bias the parts away from one another so that friction surfaces on the members are in driving engagement to provide a friction drive between the members.

A further object of the present invention is the provision of a new and improved drive mechanism in which a fluid drive is established between relatively rotatable driving and driven members and is controlled by air pressure so that the fluid drive is discontinued when the air pressure exceeds a predetermined maximum pressure and is re-established when the air pressure is below the predetermined maximum pressure.

A still further object of the present invention is the provision of a new and improved drive mechanism, as noted in the next preceding object, wherein the fluid drive is established and discontinued by shifting one of the drive members axially relative to the other drive member by an air operated piston means.

A further object of the present invention is the provision of a new and improved drive mechanism, as noted in the preceding object, wherein the output speed of the driven member is controlled so that it does not exceed a predetermined speed, regardless of the speed of the driving member.

Further objects, advantages and novel characteristics of the present invention will become apparent from the following detailed description of a preferred embodiment of the present invention made with reference to the accompanying drawings and in which:

FIG. 2 is a sectional view of part of the drive mechanism of FIG. 1 taken substantially along section line 2—2 of FIG. 1;

FIG. 3 is a view of part of the drive mechanism disclosed in FIG. 1 and showing the arrangement of the parts wherein a fluid drive is provided;

FIG. 4 is a view similar to FIG. 3 but showing relative arrangement of parts in which the fluid drive is discontinued; and FIG. 5 is a view of a portion of FIG. 2 on an enlarged scale.

Figure 1:
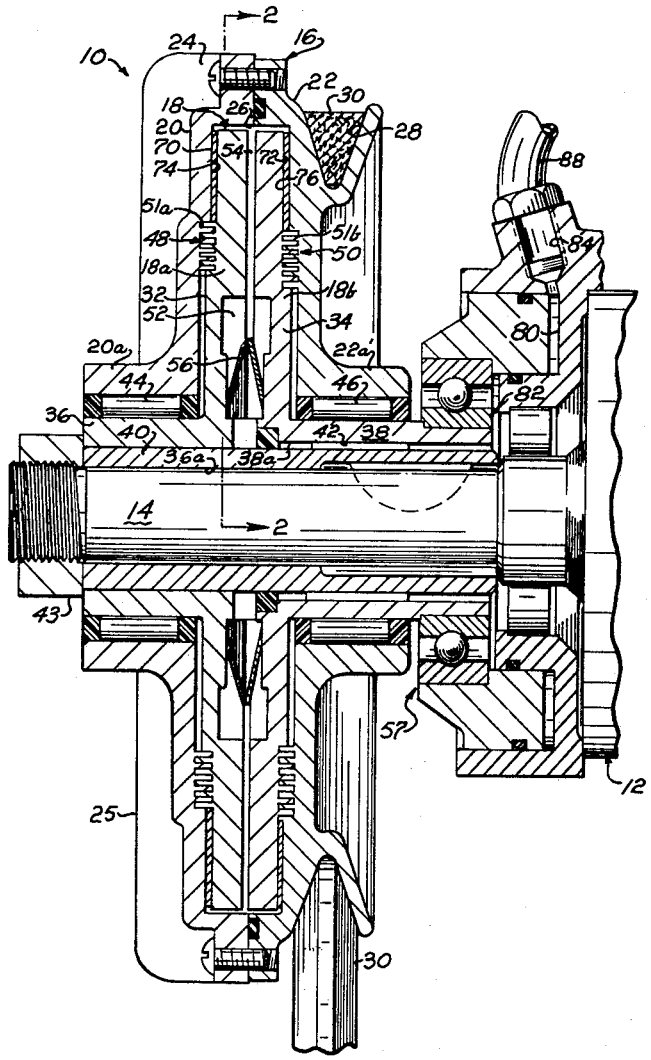
FIG. 1 is a sectional view of a drive mechanism embodying the present invention.

The present invention provides a drive mechanism for a vehicle accessory which is compact in design, durable and relatively fail-safe in operation in that it maintains a predetermined output of the accessory during operation of the vehicle engine. The drive mechanism is capable of providing a mechanical drive, which provides substantially a 1:1 drive ratio, or a fluid drive for the accessory, which provides a lower drive ratio. The drive mechanism according to the present invention can be used to drive various vehicle accessories and is particularly useful for driving an air compressor, such as the type commonly used on a truck to operate, among other things, the brakes of the truck.

As representing a preferred embodiment of the present invention, a drive mechanism 10 is shown in the drawings for driving an air compressor 12 of a vehicle. The drive mechanism 10 is supported on a projecting end of a drive shaft 14 for the air compressor 12. The drive mechanism 10 comprises an input or driving member 16 and an output or driven member 18. The driving member 16 is driven from the vehicle engine and drives the driven member 18 which, in turn, is drivingly connected to the air compressor shaft 14. The driving member 16 comprises a pair of members 20 and 22 which are interconnected along their peripheries by suitable fasteners 24. Members 20 and 22 are preferably cast from material having good heat transfer properties, such as aluminum. A plurality of cooling fins 25 are formed integral with member 20 and dissipate heat from member 16 to air forced thereabout when driving member 16 is rotated. The interior opposing faces of the members 20 and 22 are recessed to provide a drive or work chamber 26 within which a portion of the driven member 18 is disposed. The member 22 has formed integrally therewith a substantially V-shaped groove 28 which receives a belt 30. The belt 30 transmits drive from the crankshaft of the vehicle engine to the driving member 16.

The output member 18 comprises parts 18a and 18b which are of plate-like configuration. The parts 18a and 18b have radially extending portions 32 and 34 which are formed integrally with hub portions 36 and 38, respectively. The hubs 36 and 38 extend axially in opposite directions from portions 32 and 34 and have central openings 36a and 38a therein through which a sleeve 40, fixed to shaft 14, extends. The hub 36 is fixed to the sleeve 40 by any suitable means, such as by a press fit, to prevent relative movement therebetween. The portion of the sleeve 40 which is received in the hub opening 38a has a series of splines 42 which cooperate with the plurality of splines carried on the interior of the hub 38. The splines provide for axial movement of the hub 38 relative to the sleeve 40.

The sleeve 40 has a central opening 41 through which the end of shaft 14 extends. A retainer member 43 is secured to the end of shaft 14 to prevent the sleeve 40 from moving axially of the shaft 14. The sleeve 40 is keyed or otherwise suitably connected to the shaft 14 to prevent relative rotation therebetween.

Members 20 and 22 of the driving member 16 have axially projecting hub portions 20a and 22a. The hub portions 20a and 22a have axially extending openings therein and through which the hub members 36 and 38 extend. Suitable anti-friction type bearings, such as needle bearings 44 and 46 between the hub 20a and 36 and hubs 22a and 38, provide for rotation of the driving member 16 relative to the hubs 36 and 38 of the driven member 18 and permit axial movement of the driving member 16 relative to the driven member 18. Fluid seals are disposed at the opposite axial sides of the needle bearings 44 and 46 to prevent fluid leakage through the hubs 20a and 22a.

As the driving member 16 is driven by belt 30, fluid and mechanical drives may be established between the driving member 16 and the driven member 18 to drive the drive shaft 14 of the air compressor 12. The fluid drive is established between the opposing axial faces of the part 18a and member 20 and part 18b and member 22 and which have a plurality of interdigitated, spaced lands and grooves indicated generally as 48 and 50 providing opposing shear surfaces. The space between the cooperating shear surfaces of lands and grooves 48 and 50 define shear spaces 51a and 51b within which a fluid shear medium, such as silicone fluid, is received and operates to transmit drive from the driving member 16 to the driven member 18 upon rotation of the driving member 16.

The driven member 18 has a fluid reservoir 52 for the shear fluid of the drive mechanism 10. The reservoir 52 is formed in cooperating opposed recesses in the parts 18a and 18b adjacent their hubs 36 and 38. The fluid in reservoir 52 is directed into the working chamber 26 and from there into the shear spaces 51a and 51b through a fluid passageway 54. As the driven member 18 rotates, centrifugal force directs the fluid in reservoir 52 through passageway 54 into working chamber 26. The reservoir 52 is of sufficient size to hold the volume of fluid necessary to fill shear space 51. The passageway 54 is defined by the space between the opposing faces 54a and 54b of the parts 18a and 18b, respectively. As the driven member 18 rotates, the fluid flows from reservoir 52 into working chamber 26 through passageway 54. At the same time, fluid is being pumped from working chamber 26 into reservoir 52. The area of passageway 54 is such that the volume of fluid entering working chamber 26 exceeds the volume being evacuated from the working chamber and provides a net increase in the volume of shear fluid in the working chamber. The fluid in working chamber 26 or, in particular, in shear spaces 51a and 51b, establishes a viscous shear fluid drive between the driving member 16 and the driven member 18 which, in turn, drives air compressor shaft 14.

The torque transmitted by the shear fluid between the drive members 16 and 18 is a function of both the distance between the opposing shear surfaces of lands and grooves 48 and 50 and the volume of shear fluid in the shear space between the shear surfaces. The present invention provides means for simultaneously changing the distance between the shear surfaces and the volume of fluid in shear spaces 51a and 51b by shifting part 18b relative to part 18a. As part 18b moves axially to the left, as viewed in the drawings, the distance between the opposing shear surfaces of lands and grooves 48 and 50 increases and the cross-sectional area of passageway 54 decreases. Reduction of the area of passageway 54 reduces the flow of fluid into the working chamber 26 and the volume of fluid in shear spaces 51a and 51b. The net reduction of the volume of fluid in the shear spaces 51a and 51b reduces the torque transmitted between the drive members. When the faces 54a and 54b on parts 18a and 18b abut, as shown in FIG. 4, the passageway 54 is closed blocking fluid flow therethrough and the viscous fluid drive between the drive members 16 and 18 is discontinued.

As part 18b moves axially to the right, the torque transmitted by the fluid drive increases. When surfaces 54a and 54b separate, as shown in FIG. 3, passageway 54 opens and fluid flows into the shear spaces 51a and 51b. Movement of part 18b to the right away from part 18a also reduces the distance between the shear surfaces. The increased fluid volume and decreased distance between opposing shear surfaces increases the torque transmitted by the fluid drive.

The parts 18a and 18b are biased toward their FIG. 3 relationship by a bellville type spring 56. Spring 56 is disposed in the fluid reservoir 52 and operates to bias the faces 54a and 54b away from one another and the shear surfaces provided between the lands and grooves 48 and 50 toward one another. The part 18b is moved axially to the left against the biasing spring 56 by a piston means indicated generally as 57. Piston means 57 operates to move the part 18b from its FIG. 3 position to its FIG. 4 position, as will be more fully described hereafter.

The present invention provides a speed control for the driven member 18 during fluid drive between the drive members. The speed control reduces the volume of shear fluid in shear spaces 51a and 51b when the member 18 approaches its maximum desired speed. The speed control comprises a pair of pumping abutments 58 on the periphery of the axially fixed part 18a which cooperate with a pair of radially extending orifices 60 to direct fluid from the working chamber 26 into the reservoir 52. Each orifice 60 has a speed responsive valve 61 disposed therein which controls the flow of fluid through the orifice 60 into the reservoir 52. The outer ends of orifices 60 communicate with the area adjacent the abutments 58 and the innermost ends thereof communicate with the reservoir 52. When the driving member 16 is rotating relative to the driven member 18, the fluid impacts against the abutments 58 and is directed into the entrance end of the orifices 60.

Each speed responsive valve 61 comprises a ball valve member 62 seated in a ball valve seat 63 provided in passageways 60. A valve actuator rod 64 extends through passageway 60 and a fluid by-pass orifice 65 in ball valve 62 and is connected to the ball valve 62. A spring 66 acting against an abutment 64a on the inward end of rod 64 biases the rod 64 downwardly urging the ball valve 62 into the valve seat 63 to block flow around ball valve 62.

The pumping abutments 58 operate to pump fluid from working chamber 26 into reservoir 52 when the driven member 18 rotates at any speed. When driven member 18 rotates at a speed below the maximum desired speed, the ball valve members 62 are seated and fluid entering passageways 60 flows through fluid orifice 65 in ball valves 62 into reservoir 52. The combined area of orifices 65 is small in comparison to the area of the fluid passageway 54 so that during fluid drive below the maximum desired speed, the fluid leaving the reservoir 52 is greater than the fluid entering and results in a net increase in the volume of fluid in shear spaces 51a and 51b However, when the speed of driven member 18 exceeds the maximum desired speed, centrifugal force overcomes the force of spring 66 and unseats the ball valve member 62. The fluid pumped into passageway 60 flows around the unseated ball valve 62 into reservoir 52 at a greater rate than the fluid is flowing into working chamber 26 through passageway 54 and results in a net decrease in the volume of fluid in shear spaces 51a and 51b. The net decrease in fluid reduces the speed of the driven member 18. When the speed of the driven member 18 is at or below the maximum speed, spring 66 seats ball valve 62. By this arrangement, a speed governing arrangement is provided to insure that during fluid drive the driven member 18 does not exceed a predetermined speed regardless of the speed of the vehicle motor.

The present invention also provides a mechanical or positive drive between the drive members 16 and 18. The mechanical drive provides approximately a 1:1 drive ratio between members 16 and 18. As shown, the mechanical drive comprises a friction drive. The friction drive is automatically provided when the air pressure output of the air compressor 12 is below a predetermined pressure. The friction drive is established between friction surfaces 70 and 72 on exterior faces of the driven member parts 18a and 18b and friction surfaces 74 and 76 on the opposing portions of members 20 and 22 of the driving member 16. Friction surfaces 74 and 76 may be provided by strips of friction material, such as brake lining material. As further alternatives, friction surfaces 70, 72, 74, 76 could be constructed without friction material or all could have friction material or just surfaces 70, 72 could have friction material. The friction surfaces 70, 72 and 74, 76 are movable into and out of driving engagement with one another to engage and disengage the friction drive therebetween. The spring 56 biases part 18b of the driving member 18 away from part 18a and toward friction surface 76. When the spring 56 moves surface 72 into engagement with friction surface 76, as shown in FIG. 1, the friction drive is established through drive mechanism 10. The force of spring 56 is such that when surfaces 72 and 76 engage, an axial force is applied to the driving member 16 which causes sufficient axial movement of driving member 16 to the right, as viewed in the drawings, to cause friction surface 74 on member 20 to drivingly engage surface 70 on part 18a. The aforedescribed needle bearings 44 permits the described axial shifting of driving member 16.

The friction drive from surfaces 76 and 74 to surfaces 70 and 72 is discontinued by piston means 57 shifting part 18b toward part 18a which moves the surfaces 70, 72, 74 and 76 out of driving engagement. The fluid drive between the lands and grooves 48 and 50 is established when the friction drive is discontinued. This relationship is shown in FIG. 3. The positive mechanical force exerted by spring 56 provides a fail-safe drive for the air compressor. If the fluid drive is interrupted due to malfunction, spring 56 will establish the friction drive when the air pressure output of compressor 12 drops below a particular pressure.

The piston means 57, which moves part 18b to interrupt the friction drive and establish the fluid drive, includes a piston 78. The piston 78 is of annular configuration and is mounted for reciprocation in an annular cylinder 80 in the housing for the air compressor 12. The piston 78 does not rotate and is supported by the hub 38 of the axially movable part 18b through a bearing assembly 82. The outer race of the ball bearing assembly 82 is secured to the piston 78 and the inner race is secured in a recess in the right-hand end of hub 38, as viewed in FIG. 1. This arrangement permits the hub 38 to rotate relative to the piston 78 while transmitting axial movement of the piston 78 to the hub 38 to shift part 18b axially toward part 18a. The piston 78 is driven to the left, as viewed in FIG. 1, by air pressure output of the air compressor delivered through an air inlet opening 84 in the air compressor housing. Air under pressure is delivered to the air inlet 84 preferably from the air pressure tank in which the air pressure utilized by the vehicle is maintained. The air is communicated with the opening 84 through a suitable hose 88. When the air pressure acting against the rearward face of the piston 78 exceeds the force of spring 56, the piston is shifted to the left moving the hub 38 and part 18b to the left toward part 18a. When the air pressure acting against the rearward face of the piston 78 is less than the pressure exerted on the piston by the spring 56, the part 18b, hub 38 and piston 78 move to the right. The movement of the piston 78 depends on the air pressure in cylinder 80.

The air pressure in the tank which is produced by the air compressor controls the operation of the drive mechanism 10. The air compressor must maintain air pressure within a particular range in the tank to provide for proper operation of the air brakes and other accessories of the vehicle. It is assumed for purposes of illustration only that the air pressure output of the compressor 12 must be within the range of 85 p.s.i. to 105 p.s.i. At startup of the vehicle engine, assuming that the air pressure in the air pressure tank is below the minimum pressure of 85 p.s.i., the parts 18a and 18b would be in their respective positions shown in FIG. 1. In this position, the friction surfaces 70 and 72 would be in driving engagement with the friction surfaces 74 and 76 of the driving member 16 due to the biasing effect of spring 56. When the belt 30 imparts drive to the driving member 16, a friction drive is provided through the friction surfaces 70, 72, 74, 76 and the driven member 18 drives the compressor shaft 14. The friction drive continues until the pressure in the tank reaches 85 p.s.i. at which time the air pressure in cylinder 80 overcomes the force of spring 56 and moves the piston 78 to the left and member 18b into the position shown in FIG. 3. This movement disengages the friction surfaces 70 and 72 from driving surfaces 74 and 76 thereby discontinuing the friction drive and establishing the fluid drive. During the friction drive, fluid is directed from the reservoir 52 through the passageway 54 into the drive chamber 26 and into the shear spaces 51a and 51b between the lands and grooves 48 and 50 so that immediately upon disengagement of friction surfaces 72 and 76, the fluid drive takes over.

The fluid drive continues until the pressure in the air tank reaches 105 p.s.i. As the pressure builds up in the air tank, the piston 78 moves axially to the left closing the gap between the parts 18a and 18b which simultaneously increases the shear space 51b and restricts the fluid inlet passageway 54. This gradually reduces the torque transmitted between the members 16 and 18 as the air pressure increases as fluid is continually being pumped into reservoir 52 which, in conjunction with the decreased fluid flow from reservoir 52, reduces the volume of fluid in the shear spaces. When the pressure in the air supply tank reaches 105 p.s.i., the parts 18a and 18b will be in abutment, as shown in FIG. 4 and the drive through the drive mechanism 10 will be discontinued. Abutment of parts 18a and 18b closes passageway 54 and blocks fluid flow into the chamber 26. With no fluid flowing into chamber 26, pumping abutments 58 will substantially evacuate all the fluid in working chamber 26 by pumping it into reservoir 52 through passageway 60 either around ball valve 62 or through orifice 65 therein depending on the speed of the driven member 18.

During the fluid drive between the members 16 and 18, the output speed of the driven member 18 is governed so as not to exceed a predetermined speed. This is accomplished by the heretofore described pumping abutments 58, passageways 60 and speed responsive valves 61. When the speed of driven member 18 exceeds a predetermined speed, the ball valve member 61 unseats and the shear fluid is pumped therearound into the reservoir 52 at a greater rate than the flow from reservoir 52 into working chamber 26. Ball valve 62 remains unseated until the driven member 18 rotates at the selected maximum speed whereupon the spring 66 overcomes the centrifugal force tending to unseat ball 62 and seats valve member 62. The speed control operates through the pressure range in which the fluid drive is established.

When the air pressure in the air tank drops below 105 p.s.i., the spring 56 moves the parts 18a and 18b out of engagement from their FIG. 4 to their FIG. 3 position to establish a fluid drive between the members. This operation continues until the air pressure in the tank exceeds 105 p.s.i. at which time the fluid drive is discontinued by piston means 57 moving parts 18a and 18b into abutment.

If the fluid drive fails due to, for example, loss of shear fluid, the spring 56 biases the friction surface 72 into engagement with the friction surface 76 when the pressure in the air tank drops below 85 p.s.i. to establish a friction drive between the drive members 16 and 18. The friction drive would continue until the minimum pressure of 85 p.s.i. was established in the tank at which time the piston 78 would shift the friction surfaces 72 and 76 out of engagement. Hence, a safety feature is provided so that if the fluid drive fails or is interrupted for any reason, the positive mechanical effect of spring 56 assures that the air compressor 12 will be driven to provide sufficient air pressure to operate the vehicle brakes, for example.

From the foregoing, it should be apparent that a simple and highly reliable drive mechanism for driving an air compressor has been provided.

Having described my invention, I claim:

1. A drive mechanism comprising relatively rotatable driving and driven members, one of said members surrounding at least a portion of the other member and defining a drive chamber within which the other member is disposed, spaced opposed shear surfaces on said members and cooperable with a fluid shear medium in said shear space to transmit torque between said members, said other member having relatively axially movable parts, means operatively connected to said other member and operable to move said parts relatively axially into engagement to effect a reduction in the fluid drive between said members and to move said parts relatively axially away from each other to effect an increase in the fluid drive between the members, a fluid reservoir in said other member, means biasing said parts away from each other to provide a space between opposing surfaces of said parts, said space providing a fluid passageway which communicates said drive chamber and said reservoir whereby when said means operatively connected to said other member moves said parts into engagement, fluid flow through said passageway is blocked and said fluid drive between said members is discontinued.

2. A drive mechanism as defined in claim 1 wherein said other member has pumping means on the periphery thereof, a second radially extending passageway in said other member communicating said drive chamber adjacent said pumping means and said reservoir, centrifugally actuated valve means in said passageway and movable in response to said other member rotating above a predetermined speed to reduce the volume of fluid in the shear space.

3. A drive mechanism comprising relatively rotatable driving and driven members, one of said members surrounding at least a portion of the other member and defining a drive chamber within which the other member is disposed, spaced opposed shear surfaces on said members and cooperable with a fluid shear medium in said shear space to transmit torque between said members, said other member having relatively axially movable parts, means operatively connected to said other member and operable to move said parts relatively axially into engagement to effect a reduction in the fluid drive between said members and to move said parts relatively axially away from each other to effect an increase in the fluid drive between the members, one of said parts being fixed against axial movement and the other of said parts being movable axially relative thereto, said means operable to move said parts including spring means disposed between said parts and operable to bias said movable part in a first direction away from said fixed part, and friction surfaces on said movable part and opposing portion of said one member and biased into engagement by said spring to provide a friction drive therebetween.

4. The drive mechanism as defined in claim 3 wherein said means operable to move said parts further includes an air operated piston means operatively connected to said movable part and operable to move said movable part relative to said fixed part a first extent in a second direction to discontinue the friction drive between said friction surfaces and establish said fluid drive between said members, said piston further operable to move said movable member a second extent in said second direction whereby said fixed and movable parts abut and said fluid drive between said members is discontinued.

5. A drive mechanism comprising relatively rotatable driving and driven members, one of said members surrounding at least a portion of the other member and defining a drive chamber within which the other member is disposed, spaced opposed shear surfaces on said members and cooperable with a fluid shear medium in said shear space to transmit torque between said members, said other member having relatively axially movable parts, means for providing a flow of fluid shear medium to said shear space, and means operatively connected to said other member and operable to move said parts relatively axially toward each other to block the flow of fluid shear medium to said shear space to thereby effect a reduction in the fluid drive between said members and to move said parts relatively axially away from each other to permit fluid shear medium to flow to said shear space to thereby effect an increase in the fluid drive between the members.

6. A drive mechanism comprising relatively rotatable driving and driven members, said members having spaced opposed shear surfaces defining a shear space therebetween, a fluid shear medium in said shear space and cooperable with said shear surfaces to transmit torque therebetween, means for providing a flow of fluid shear medium to and from said shear space, means including air pressure operated means for blocking the flow of fluid shear medium to said shear space to thereby effect a reduction in the fluid drive between said members in response to a first air pressure and for permitting fluid shear medium to flow to said shear space to effect an increase in the fluid drive in response to receipt of a second air pressure.

7. A drive mechanism as defined in claim 6 further including means mounting said shear surfaces for relative axial movement to vary the spacing between said surfaces and said air pressure operated means being operatively connected to one of said surfaces to effect said relative axial movement.

8. A drive mechanism comprising relatively rotatable driving and driven members, said driven member including an axially fixed part and an axially movable part, said members having spaced opposed shear surfaces defining a shear space therebetween, one of said shear surfaces being located on said axially movable part, a fluid shear medium in said shear space and cooperable with said shear surfaces to transmit torque therebetween, means for providing a flow of fluid shear medium to and from said shear space, means including air pressure operated means for blocking the flow of fluid shear medium to said to said shear space to thereby effect a reduction in the fluid drive between said members in response to a first air pressure and for permitting fluid shear medium to flow to said shear space to effect an increase in the fluid drive in response to receipt of a second air pressure, said air pressure operated means including a piston operatively connected to said movable part to effect relative axial movement between said shear surfaces.

9. A drive mechanism as defined in claim 8 further including a fluid reservoir on said driven member and said parts having opposed surfaces defining, when spaced from one another, a fluid passageway communicating said fluid reservoir and said shear space and said passageway being reduced in area as said movable part moves toward said fixed part by said piston means whereby as the space between said shear surfaces increases, there is a corresponding decrease in the space between said opposed surfaces on said parts.

10. A drive mechanism comprising relatively rotatable driving and driven members, said members having spaced opposed shear surfaces defining a shear space therebetween, a fluid shear medium in said shear space and cooperable with said shear surface to transmit torque therebetween, means for providing a flow of fluid shear medium to and from said shear space, means including air pressure operated means for blocking the flow of fluid shear medium to said shear space to thereby effect a reduction in the fluid drive between said members in response to a first air pressure and for permitting fluid shear medium to flow to said shear space to effect an increase in the fluid drive in response to receipt of a second air pressure, and speed responsive means for permitting the fluid shear medium to flow from said shear space at a rate which is greater than the flow of fluid shear medium to said shear space when the speed of said driven member reaches a predetermined speed to thereby limit the speed at which said driving member drives said driven member to a speed which is equal to or less than said predetermined speed.

11. A drive mechanism comprising relatively rotatable driving and driven members, one of said members surrounding at least a portion of the other member and defining a drive chamber within which the other member is disposed, spaced opposed shear surfaces on said members and cooperable with a fluid shear medium in said shear space to transmit torque between said members, said other member having relatively axially movable parts, means operatively connected to said other member for moving said parts relatively axially toward and away from each other to adjust a fluid drive between the members, and friction surfaces on said parts and opposing portions of said one member, said means for moving said parts being selectively operable to move said friction surfaces on said parts into engagement with said friction surfaces on said opposing portions of said one member to thereby provide a friction drive between said driving and driven members.

12. A drive mechanism as set forth in claim 11 wherein said shear surfaces on said other member are located on said parts adjacent to said friction surfaces on said parts.

13. A drive mechanism comprising relatively rotatable driving and driven members, said members having spaced opposed shear surfaces defining a shear space therebetween, a fluid shear medium in said shear space and cooperable with said shear surfaces to transmit torque therebetween, said driving member defining in part an expansible chamber means for fluid shear medium, means for providing a flow of fluid shear medium between said shear space and said chamber means, and means for moving said driven member to contract said chamber means to increase the space between said shear surfaces and to thereby effect a reduction in the fluid drive between said members and for moving said driven member to expand said chamber means to decrease the space between said shears surfaces and to thereby effect an increase in the fluid drive between said members, and means for blocking a flow of fluid shear medium to said shear space when said driven member moves to contract said chamber means.

References Cited
UNITED STATES PATENTS

| | | |
|---|---|---|
| 2,879,755 | 3/1959 | Weir. |
| 2,988,188 | 6/1961 | Tauschek. |
| 3,053,363 | 9/1962 | Weir. |
| 3,071,225 | 1/1963 | Blau et al. |
| 3,319,754 | 5/1967 | Kokochak et al. _____ 192—57 |

MARK M. NEWMAN, Primary Examiner

ALLAN D. HERRMANN, Assistant Examiner

U.S. Cl. X.R.

192—58, 70, 91, 104